3,321,452
MODIFYING POLYMERS
David S. Breslow, Wilmington, Del., assignor to Hercules Incorporated, a corporation of Delaware
No Drawing. Filed Mar. 24, 1964, Ser. No. 354,442
6 Claims. (Cl. 260—85.3)

This invention relates to modifying polymers and to the products so produced. More particularly, the invention relates to modifying alpha-alkyl polymers with azidotriazines and sulfur and to the products so produced.

In the past sulfur and sulfur-bearing materials have been used almost exclusively as vulcanizing, i.e., cross-linking, agents. It has more recently been discovered that certain organic peroxides are capable of vulcanizing specific polymers. However, all of the above agents suffer serious drawbacks. Because of their mode of action these agents are not readily effective in cross-linking polymers containing a substantial proportion of alpha-alkyl groups. In fact, polymers such as polyisobutylene are actually degraded, i.e., suffer chain scission, when treated with organic peroxides. On the other hand, sulfur alone has no effect at all on alpha-alkyl polymers.

Now, in accordance with this invention it has unexpectedly been found that alpha-alkyl polymers, i.e., polymers containing at least about 80 mole percent of a component having the formula

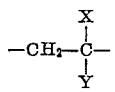

where Y is an alkyl radical and X is a hydrogen or alkyl radical, can be cross-linked by heating in the presence of an azidotriazine and a small amount of sulfur to produce vulcanizates that are tough, resilient and solvent resistant. In addition, alpha-alkyl polymers can be treated with smaller amounts of azide and sulfur to improve their properties without materially affecting their solubility.

Any azidotriazine, i.e., any compound having the general formula

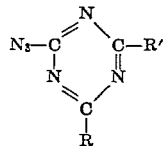

where R is hydrogen, an azide or an organic radical inert to the modifying reaction and R' is hydrogen or an organic radical inert to the modifying reaction, can be used in the process of this invention. Most preferably, the organic radical will be alkyl, aryl, amino, alkylamino, dialkylamino, arylamino, diarylamino, aryl-alkylamino, alkoxy, aryloxy, acyloxy, alkylthio or arylthio. Exemplary of the most preferred azidotriazines are 2-dodecylamino - 4,6 - diazido-s-triazine, 2,4-dipiperidino-6-azido-s-triazine, 2 - dicyclohexylamino - 4,6 - diazido-s-triazine, 2-anilino - 4,6 - diazido-s-triazine, 2-diphenylamino-4,6-diazido - s-triazine, 2-N-methylanilino-4,6-diazido-s-triazine, 2 - ethyl - 4,6-diazido-s-triazine, 2-phenyl-4,6-diazido-s-triazine, 2-ethoxy-4,6-diazido-s-triazine, 2-phenoxy-4,6-diazido - s-triazine, 2-thiophenoxy-4,6-diazido-s-triazine, 2-acetoxy-4,6-diazido-s-triazine, etc.

Any polymer, homopolymer, or copolymer containing at least about 80 mole percent of a component having the formula

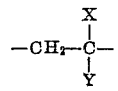

where Y is an alkyl radical and X is a hydrogen or alkyl radical, said alkyl radicals containing from 1 to 18 carbon atoms, can be modified by the process of this invention. The process is applicable whether the polymer be crystalline or amorphous or a mixture thereof. Exemplary of the polymers that can be modified are polypropylene, polyisobutylene, poly(3-methyl-1-butene), butyl rubber, poly(4-methyl-1-pentene), ethylene-propylene copolymers (containing at least about 80 mole percent propylene), etc.

The modification process of this invention can be carried out by heating the polymer plus the azidotriazine and sulfur above the decomposition temperature of the azide. This temperature varies over a wide range, but, in general, will be in the range of from about 150° C. to about 300° C. Various amounts of azidotriazine and sulfur can be added, the optimum amount depending on the amount of cross-linking or other modification desired, the specific azidotriazine employed, etc. In general, the amount of azidotriazine added, based on the weight of the polymer, will be from about 0.001% to about 30%, most preferably from about 0.1% to about 30%, and the amount of sulfur added will be from about 0.001% to about 10%, most preferably from about 0.01% to about 10%, based on the weight of the polymer.

The azidotriazine and sulfur can be incorporated in the polymer in any desired fashion. For example, they can be uniformly blended by simply milling on a conventional rubber mill or dissolved in a solution containing a dispersion of the polymer. By either means, the azidotriazine and sulfur are distributed throughout the polymer and uniform cross-linking or other modification is effected when the blend is subjected to heat. Other methods of mixing the azidotriazine and sulfur with the polymer will be apparent to those skilled in the art.

In addition to the azidotriazine and sulfur, other ingredients can also be incorporated. The additives commonly used in rubber vulcanizates can be used here also, as, for example, extenders, fillers, pigments, stabilizers, plasticizers, etc. Exemplary of the fillers that can be added are calcium carbonate, iron oxide, carbon black, silica, calcium silicate (hydrated), alumina, etc. The presence of a filler, and in particular carbon black, is beneficial in some cases. Obviously, there are many cases in which an additive is not required or desired and excellent results are achieved when only the azidotriazine and sulfur are added.

The following examples are presented for purposes of illustration, parts and percentages being by weight unless otherwise specified. The molecular weight of the propylene polymers is indicated by the Reduced Specific Viscosity (RSV) given for each. By the term "Reduced Specific Viscosity" is meant the $\eta sp./C$. determined on a 0.1% solution (0.1 g. of the polymer per 100 ml. of solution) of the polymer. Melting points, where given, are determined by loss of birefringence.

The extent of cross-linking is determined by analysis for percent gain in insolubility in solvents in which the uncross-linked polymer is soluble, hereinafter termed "percent gel."

Percent gel is determined as follows: A weighed sample of polymer is soaked in a solvent at an elevated temperature. The sample is then removed and dried to constant weight. The weights of initial and final sample are corrected for polymer and copolymer content based on knowledge of components. From these figures $$\frac{\text{corrected dry weight}}{\text{corrected initial weight}} \times 100 = \text{percent gel}$$

Example 1

An azidotriazine was prepared as follows: 2-dicyclohexylamino-4,6-dichloro-s-triazine dissolved in a mixture of acetone and dimethylforamide was treated with sodium azide to give a good yield of high purity 2-dicyclohexylamino-4,6-diazido-s-triazine.

To 100 parts of finely divided polypropylene having a crystalline melting point of 167° C. and an RSV of 3.8 was added 2 parts of 2-dicyclohexylamino-4,6-diazido-s-triazine and 0.2 part sulfur dissolved in 200 parts of acetone. The resulting slurry was evaporated to dryness in vacuo and then cured by heating in a steel press for 12 minutes at a temperature of 215° C. under a pressure of 800 p.s.i. The resulting vulcanizate had a percent gel of 64 as determined in decahydronaphthalene at 140° C. Two control samples of the polypropylene were treated in the same way except the azidotriazine was omitted from one and the azidotriazine and sulfur were omitted from the other. Both controls were completely soluble in decahydronaphthalene at 140° C.

*Example 2*

An azidotriazine was prepared as follows: 2-dodecylamino-4,6-dichloro-s-triazine, dissolved in a mixture of acetone and dimethylformamide, was treated with sodium azide to give a good yield of 99% pure 2-dodecylamino-4,6-diazido-s-triazine.

To 100 parts of an isobutylene polymer, having a molecular weight of 70,000 dissolved in 3,000 parts of chloroform, was added 3 parts of 2-dodecylamino-4,6-diazido-s-triazine and 0.3 part of sulfur. The resulting solution was evaporated to dryness in a vacuum and then heated in a closed iron mold for 1 hour at 200° C. The resulting vulcanizate was substantially insoluble in toluene at 80° C. Two control samples of the isobutylene polymer were treated in the same way except that the azide was omitted from one and the azide and sulfur from the other. Both samples were completely soluble in toluene at 80° C.

*Example 3*

To 100 parts of an isobutylene-isoprene copolymer (containing 2.0 mole percent isoprene) dissolved in 3,000 parts of chloroform was added 2.5 parts of 2-dodecylamino-4,6-diazido-s-triazine and 0.25 part of sulfur. The resulting solution was evaporated to dryness in vacuum and then cured as described in Example 2. The resulting vulcanizate was substantially insoluble in toluene at 80° C. Two control samples of the copolymer were treated in the same way except that the azide was omitted from one and the azide and sulfur from the other. Both samples were completely soluble in toluene at 80° C.

What I claim and desire to protect by Letters Patent is:

1. A polymer containing at least about 80 mole percent of a component having the formula

where Y is an alkyl radical and X is a radical selected from the group consisting of hydrogen and alkyl radicals modified a small amount of sulfur and with an azidotriazine having the formula

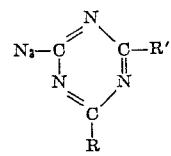

where R is a radical selected from the group consisting of hydrogen, azide and inert organic radicals and R' is a radical selected from the group consisting of hydrogen and inert organic radicals.

2. The product of claim 1 wherein the polymer is a homopolymer.
3. The product of claim 2 wherein the homopolymer is polypropylene.
4. The product of claim 2 wherein the homopolymer is polyisobutylene.
5. The product of claim 1 wherein the polymer is a copolymer.
6. The product of claim 5 wherein the copolymer is poly(isobutylene-isoprene).

No references cited.

JOSEPH L. SCHOFER, *Primary Examiner.*

L. EDELMAN, *Assistant Examiner.*